United States Patent
Ptak et al.

(10) Patent No.: US 10,983,661 B2
(45) Date of Patent: *Apr. 20, 2021

(54) INTERFACE FOR POSITIONING AN OBJECT IN THREE-DIMENSIONAL GRAPHICAL SPACE

(71) Applicant: MICROSOFT TECHNOLOGY LICENSING, LLC, Redmond, WA (US)

(72) Inventors: Barry John Ptak, Letchworth Garden City (GB); David Mondelore, London (GB); Alexander Charles Cullum, Maidenhead (GB)

(*) Notice: Subject to any disclaimer, the term of this patent is extended or adjusted under 35 U.S.C. 154(b) by 606 days.

This patent is subject to a terminal disclaimer.

(21) Appl. No.: 15/428,874

(22) Filed: Feb. 9, 2017

(65) Prior Publication Data

US 2018/0113596 A1 Apr. 26, 2018

Related U.S. Application Data (60) Provisional application No. 62/411,983, filed on Oct. 24, 2016.

(51) Int. Cl.
*G06F 3/00* (2006.01)
*G06F 3/0481* (2013.01)
(Continued)

(52) U.S. Cl.
CPC ...... *G06F 3/04815* (2013.01); *G06F 3/04845* (2013.01); *G06T 19/20* (2013.01); *G06T 2200/24* (2013.01); *G06T 2219/2016* (2013.01)

(58) Field of Classification Search
CPC . G06F 3/04815; G06F 3/04845; G06T 19/20; G06T 2200/24; G06T 2219/2016
See application file for complete search history.

(56) References Cited

U.S. PATENT DOCUMENTS 6,130,673 A * 10/2000 Pulli ...................... G06T 17/30
345/423
6,448,964 B1 * 9/2002 Isaacs ................... G06F 3/0362
345/419

(Continued)

OTHER PUBLICATIONS

"Displaying 3D models in PDFs", http://web.archive.org/web/20140419064357/http:/helpx.adobe.com/acrobat/using/displaying-3d-models-pdfs.html, Published on: Apr. 19, 2014, 10 pages.

(Continued)

*Primary Examiner* — Tadesse Hailu
*Assistant Examiner* — Andrew Chung
(74) *Attorney, Agent, or Firm* — Shook, Hardy & Bacon, LLP (57) ABSTRACT

Aspects of the technology described herein provide a control interface for manipulating a 3-D graphical object within a virtual drawing space. The control can be activated by selecting a graphical object or objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space. The control interface comprises a visible mesh that helps the user position the object in space relative to other objects.

20 Claims, 7 Drawing Sheets

(51) Int. Cl.
*G06F 3/0484* (2013.01)
*G06T 19/20* (2011.01)

(56) References Cited

U.S. PATENT DOCUMENTS

| | | | |
|---|---|---|---|
| 6,918,087 B1 | 7/2005 | Gantt | |
| 8,477,154 B2* | 7/2013 | Davis | G06T 19/00 |
| | | | 345/419 |
| 9,207,756 B2 | 12/2015 | Yi et al. | |
| 9,244,590 B1* | 1/2016 | Browder | G06F 3/04815 |
| 10,382,287 B2* | 8/2019 | Jadhav | G06F 15/16 |
| 10,558,770 B1* | 2/2020 | Kanthasamy | G06T 17/20 |
| 2002/0175948 A1* | 11/2002 | Nielsen | G06F 3/033 |
| | | | 715/781 |
| 2003/0179230 A1* | 9/2003 | Seidman | G06F 3/1454 |
| | | | 715/750 |
| 2005/0149877 A1* | 7/2005 | Rice | A61B 5/0059 |
| | | | 715/764 |
| 2007/0247455 A1* | 10/2007 | Hyun | G06T 13/00 |
| | | | 345/419 |
| 2008/0036776 A1 | 2/2008 | Niles et al. | |
| 2008/0291217 A1* | 11/2008 | Vincent | G06T 19/00 |
| | | | 345/629 |
| 2009/0083673 A1* | 3/2009 | Fitzmaurice | G06F 3/04815 |
| | | | 715/851 |
| 2009/0083678 A1 | 3/2009 | Fitzmaurice et al. | |
| 2009/0100366 A1* | 4/2009 | Fitzmaurice | G06T 15/20 |
| | | | 715/767 |
| 2010/0245352 A1 | 9/2010 | Chakraborty | |
| 2010/0268457 A1 | 10/2010 | Mccrae et al. | |
| 2012/0032958 A1 | 2/2012 | Werline | |
| 2012/0131498 A1* | 5/2012 | Gross | G06F 19/321 |
| | | | 715/788 |
| 2013/0135305 A1* | 5/2013 | Bystrov | G06T 7/11 |
| | | | 345/420 |
| 2013/0249912 A1* | 9/2013 | Schmidt | G06T 19/20 |
| | | | 345/424 |
| 2013/0293686 A1* | 11/2013 | Blow | G06T 7/55 |
| | | | 348/50 |
| 2013/0322702 A1* | 12/2013 | Piemonte | G01C 21/3638 |
| | | | 382/113 |
| 2014/0062998 A1* | 3/2014 | Ofstad | G06F 3/04815 |
| | | | 345/419 |
| 2014/0129990 A1* | 5/2014 | Xin | G06F 3/017 |
| | | | 715/849 |
| 2014/0136153 A1* | 5/2014 | Chen | G06T 19/20 |
| | | | 703/1 |
| 2014/0229871 A1 | 8/2014 | Tai et al. | |
| 2015/0346981 A1* | 12/2015 | Johnson | G06F 3/04847 |
| | | | 345/419 |
| 2017/0287230 A1* | 10/2017 | Gortler | G06F 3/0488 |

OTHER PUBLICATIONS

Khan, et al., "ViewCube: a 3D orientation indicator and controller", In Proceedings of the symposium on Interactive 3D graphics and games, Feb. 15, 2008, pp. 17-25.

Phillips, et al., "Automatic Viewing Control for 3D Direct Manipulation", In Proceedings of the symposium on Interactive 3D graphics, Jun. 1, 1992, pp. 71-74.

Fitzmaurice, et al., "Safe 3D Navigation", In Proceedings of the symposium on Interactive 3D graphics and games, Feb. 15, 2008, pp. 7-15.

* cited by examiner

INTERFACE FOR POSITIONING AN OBJECT IN THREE-DIMENSIONAL GRAPHICAL SPACE

CROSS-REFERENCE TO RELATED APPLICATIONS

This application claims the benefit of U.S. Provisional Application No. 62/411,983, filed Oct. 24, 2016, entitled "INTERFACE FOR POSITIONING AN OBJECT IN THREE-DIMENSIONAL GRAPHICAL SPACE," the entirety of which is herein incorporated by reference.

BACKGROUND

When adjusting the position of a three-dimensional object in three-dimensional graphic space it can be difficult for a viewer to locate the object in the z dimension relative to other objects. This is especially true when the objects are not adjacent in an x-y plane.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a control interface for manipulating a 3-D graphical object within a virtual drawing space. The control can be activated by selecting a graphical object or group of objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space.

Selecting the z-translation control can cause the camera view of the drawing space to change to give the user a better perspective of the z-location of the objects. The new view can be from above, below, or to a side. In one aspects, the object can be moved forward towards the view or backwards away from the view using a control to the side of the screen. In one aspect, a translucent mesh is displayed in the x-y coordinate plane that intersects the object upon activation of the z-translation control. The plane can intersect the centroid of the object. The plane can move as the object moves to help the user compare the depth of the object to the depth of other objects in the virtual drawing space.

In one aspect, the control comprises a visible bounding box that surrounds the selected object or objects. The bounding box comprise bars that can resize the object uniformly or non-uniformly in the X, Y, or Z dimension. The control interface also comprises controls that rotate the object around an x-axis, an y-axis, or an z-axis.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a control interface for manipulating a 3-D graphical object within a virtual drawing space. The control can be activated by selecting a graphical object or objects. When multiple objects are selected, the manipulations can occur as a group. In one aspect, the manipulations occur around the centroid of the 3-D graphical object, or group of objects. The manipulations can include rotation, size adjustment, and positional adjustment within the virtual drawing space.

Selecting the z-translation control can cause the camera view of the drawing space to change to give the user better perspective on the z-location (or depth) of the objects. The new view can be from above, below, or to a side, instead of aligned with the z-axis. In one aspects, the object can be moved forward towards the viewer or backwards away from the viewer using a control to the side of the screen. In one aspect, a translucent mesh is displayed in the x-y coordinate plane and intersects the object upon activation of the z-translation control. The plane can intersect the centroid of the object. The plane can move as the object moves to help the user compare the depth of the object to the depth of other objects in the virtual drawing space.

In one aspect, the control comprises a visible bounding box that surrounds the selected object or objects. The bounding box comprise bars that can resize the object uniformly or non-uniformly in the X, Y, or Z dimension. The control interface also comprises controls that rotate the object around an x-axis, an y-axis, or an z-axis. The rotation can be about an object-centric axis, world axis, or some other axis. As used herein, an object-centric axis intersects the centroid of the object, but is otherwise directionally aligned with the corresponding x, y, or z world-centric axes.

The object-centric axes are independent of the x, y, and z world axes within the virtual drawing space.

Figure 1:
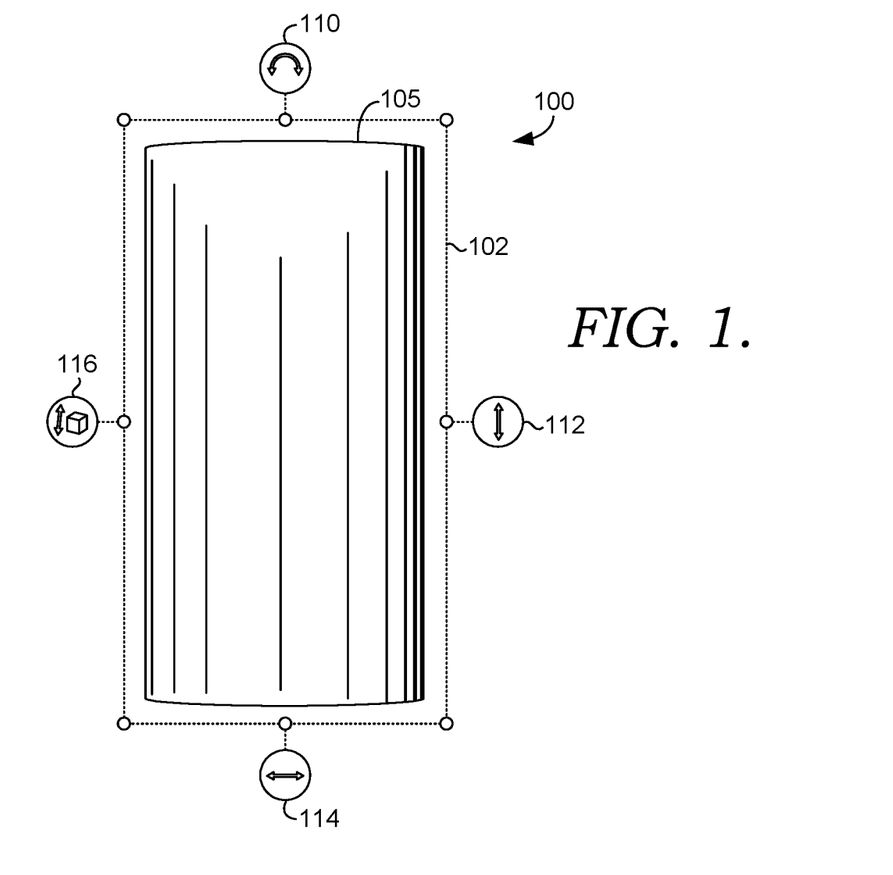
FIG. 1 shows a view of the control interface just after selection of an object, in accordance with aspects of the present disclosure.

Turning now to FIG. 1, a view of the control interface 100 is shown around a three-dimensional cylinder 105. The control interface includes a bounding box 102. The control interface 100 also includes a z-axis manipulator control 110, an x-axis manipulator control 112, a z-axis manipulator control 114, and a z-translation control 116. A user can rotate the cylinder 105 about the z-axis using the z-axis manipulator control 110. In an aspect, selecting a right side of the z-axis manipulator control 110 will rotate the top of the cylinder 105 to the right from the viewer's perspective. In an aspect, selecting the left side of the z-axis manipulator control 110 will rotate the top of the cylinder 105 to the left. Alternatively, the z-axis manipulator control 110 can rotate the object around the z-axis in only one direction. The z-axis manipulator control 110 can be depicted as an arrow.

The x-axis manipulator control 112 can be used to rotate the cylinder 105 about the x-axis. In an aspect, selecting one portion of the x-axis manipulator control 112 will rotate the top of the cylinder 105 towards the viewer. In an aspect, selecting the opposite side of the x-axis manipulator control 112 will rotate the top of the cylinder 105 away from the viewer. Alternatively, the x-axis manipulator control 112 can rotate the object around the x-axis in only one direction.

The y-axis manipulator control 114 can be used to rotate the cylinder 105 about the y-axis. In an aspect, selecting one portion of the y-axis manipulator control 114 will rotate the cylinder 105 a first direction. In an aspect, selecting the opposite side of the y-axis manipulator control 114 will rotate the cylinder 105 in the opposite direction. Alternatively, the y-axis manipulator control 114 can rotate the object around the y-axis in only one direction.

The z-translation controller 116 can change an object's positional depth within the virtual drawing space. The depth of an object corresponds to the z-value of the object's centroid. Increasing the z value of the centroid can be described as moving the object forward towards the viewer. Decreasing the z-value of the centroid can be described as moving the object backwards away from the viewer.

In one aspect, upon selecting the z-translation control 116, the camera view changes to improve the user's perspective of the object's position along the z-axis. The camera view could move upward, downward or off to a side to improve the user's perspective.

A track oriented in parallel to the z-axis can appear below the control 116 and the user can change the depth of the cylinder 105 by sliding the control towards the viewer or away from the viewer along the track. In one aspect, a translucent mesh in the x-y coordinate plane that intersects the cylinder 105 is displayed upon activation of the control 116. The plane can intersect the centroid of the cylinder 105. The plane can move as the cylinder 105 moves to help the user compare the depth of the cylinder 105 to the depth of other objects in the virtual drawing space.

Figure 2:
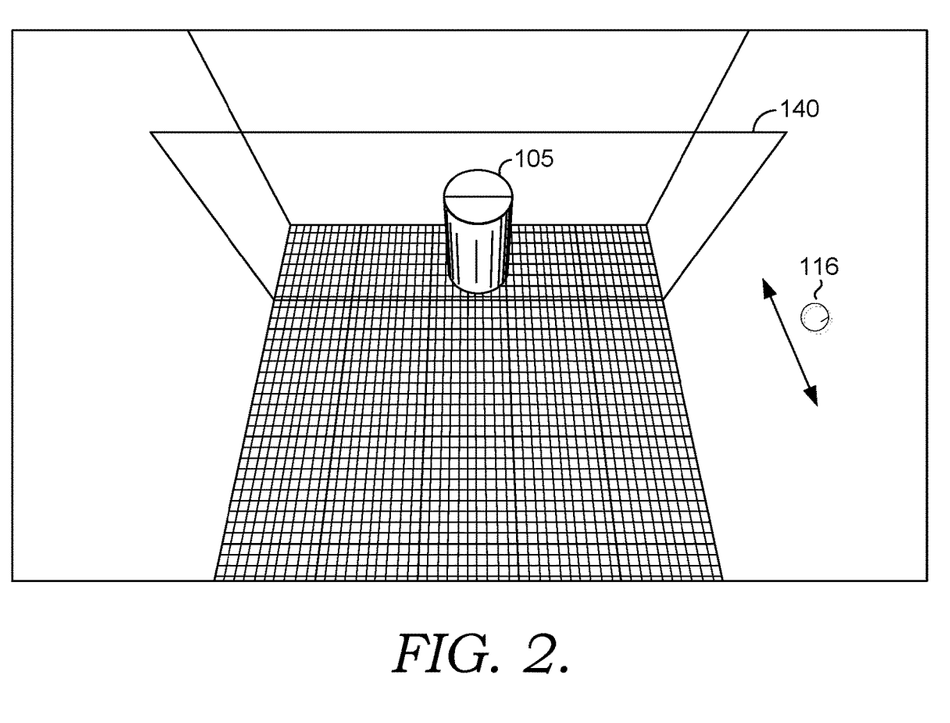
FIG. 2 shows a camera view for positioning objects within the three-dimensional graphics space, in accordance with aspects of the present disclosure.

Turning now to FIG. 2, a positioning view for positioning objects within the three-dimensional graphics space is shown. The positioning view can be generated in response the selection of the z-translation control 116. The view is generated by moving the camera above a y-z plane that runs through the object. The y-z plane is relative to world space. As can been seen from FIG. 2, the camera is viewing the scene from above the cylinder 105 at about a 45° angle from in front of the cylinder 105.

The positioning view can include a visible and translucent mesh 140 in an x-y plane that intersects the centroid of a selected object, such as the cylinder 105. The visible mesh 140 could take the form of any visible indication. As can be seen, the mesh plane is projected throughout the virtual drawing space. The object can be moved by sliding the z-translation control 116 forward or backwards. As the object moves, the visible mesh 140 also moves. The appearance of objects that intersect the mesh can change to indicate an intersection has occurred. The mesh can be transparent so that objects behind the mesh are still visible.

The z-translation control 116 is off to the side, in this example the right side, of the scene. Locating the control 116 off to the side allows the objects to be moved without occlusion by the user's hand or stylus (especially on a touchscreen device). In other words, the user's hand does not occlude the objects shown on the screen when the user is touching the control, since the control is located away from the object(s) being moved. In another aspect, the control 116 is located on the left side of the screen. The location of controller may be configurable by the user. In another aspect the right or left handedness of the user is detected automatically. The control can be then located on the same side as the user's dominant hand.

Figure 3:
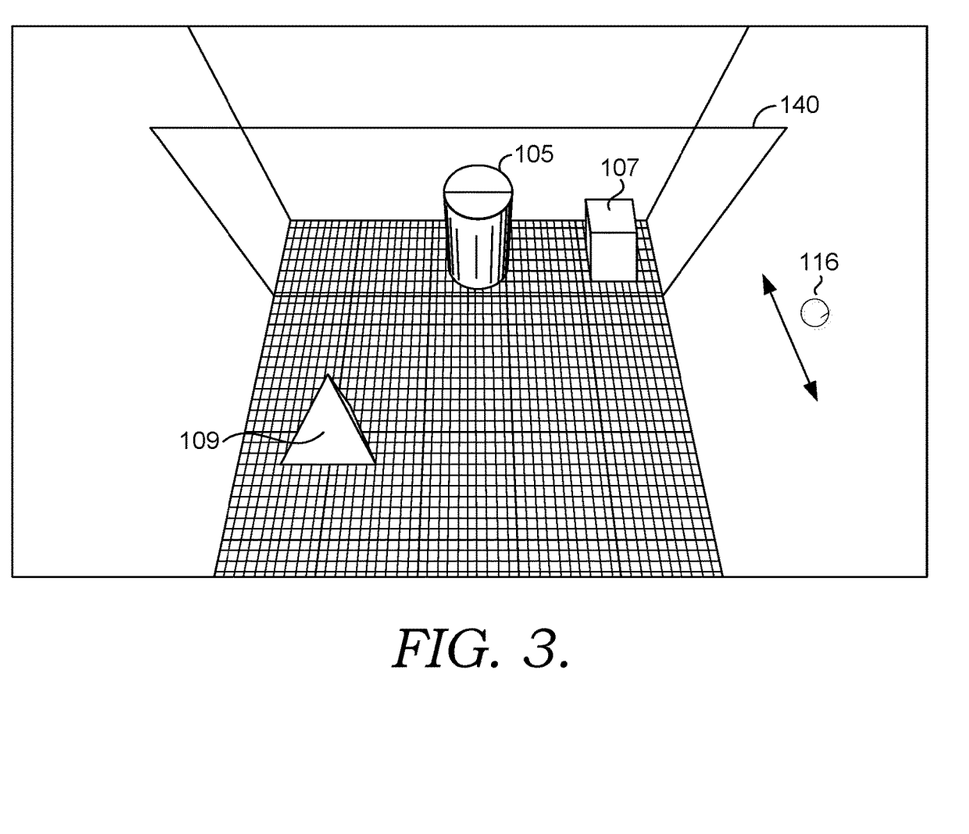
FIG. 3 shows a camera view for positioning objects within the three-dimensional graphics space relative to other objects, in accordance with aspects of the present disclosure.

Turning now to FIG. 3, the positioning view is shown with the addition of a cube 107 and a pyramid 109. As can be seen, each of the three objects is located at different depths and the mesh 140 only intersects the cylinder 105. However, the cube 107 is visible through the transparent mesh 140. As the user moves the control 116 forward or backward, the cylinder 105 moves forward or backward with the mesh 140.

Figure 4:
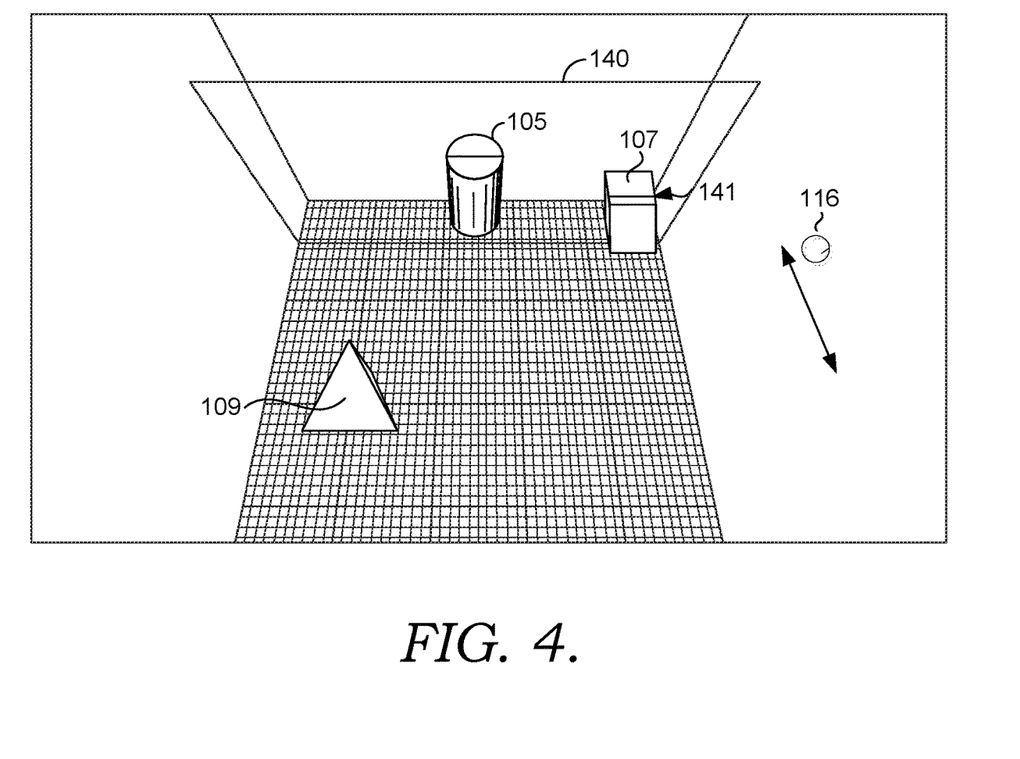
FIG. 4 shows a camera view for positioning objects within the three-dimensional graphics space relative to other objects, in accordance with aspects of the present disclosure.
Figure 5:
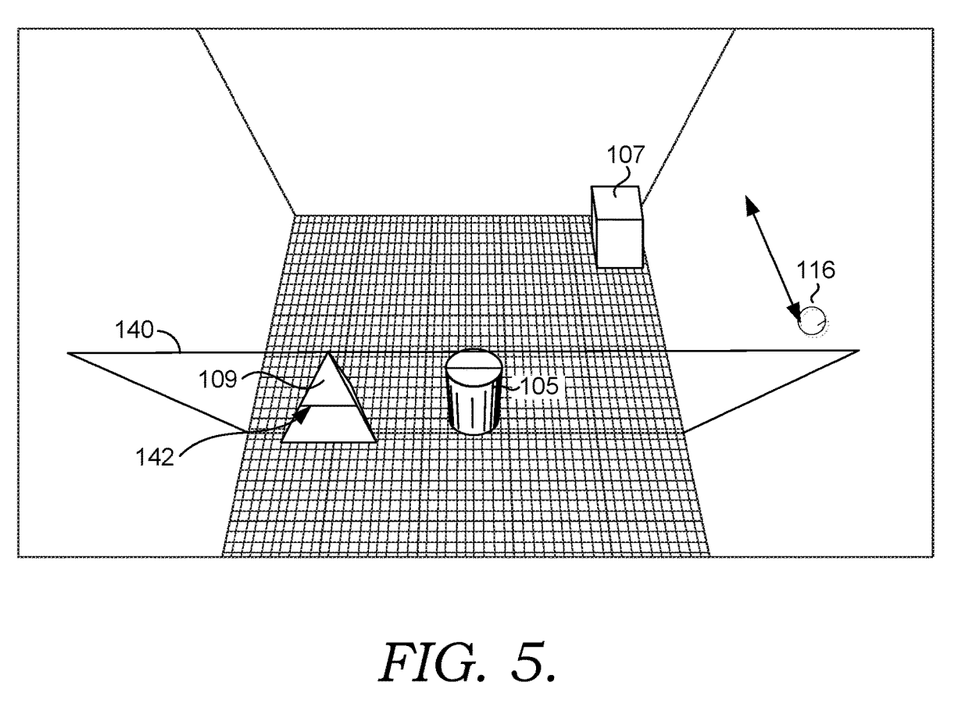
FIG. 5 shows a camera view for positioning objects within the three-dimensional graphics space relative to other objects, in accordance with aspects of the present disclosure.

As can be seen in FIG. 4, as the mesh intersects the cube 107, an intersection line 141 appears at the point of intersection between the mesh 140 and the cube 107. As the user moves the control 116 backwards, as shown in FIG. 5, the cylinder 105 moves backwards along with the mesh 140. An intersection line 142 can be seen where the mesh 140 intersects with the pyramid 109.

Figure 6:
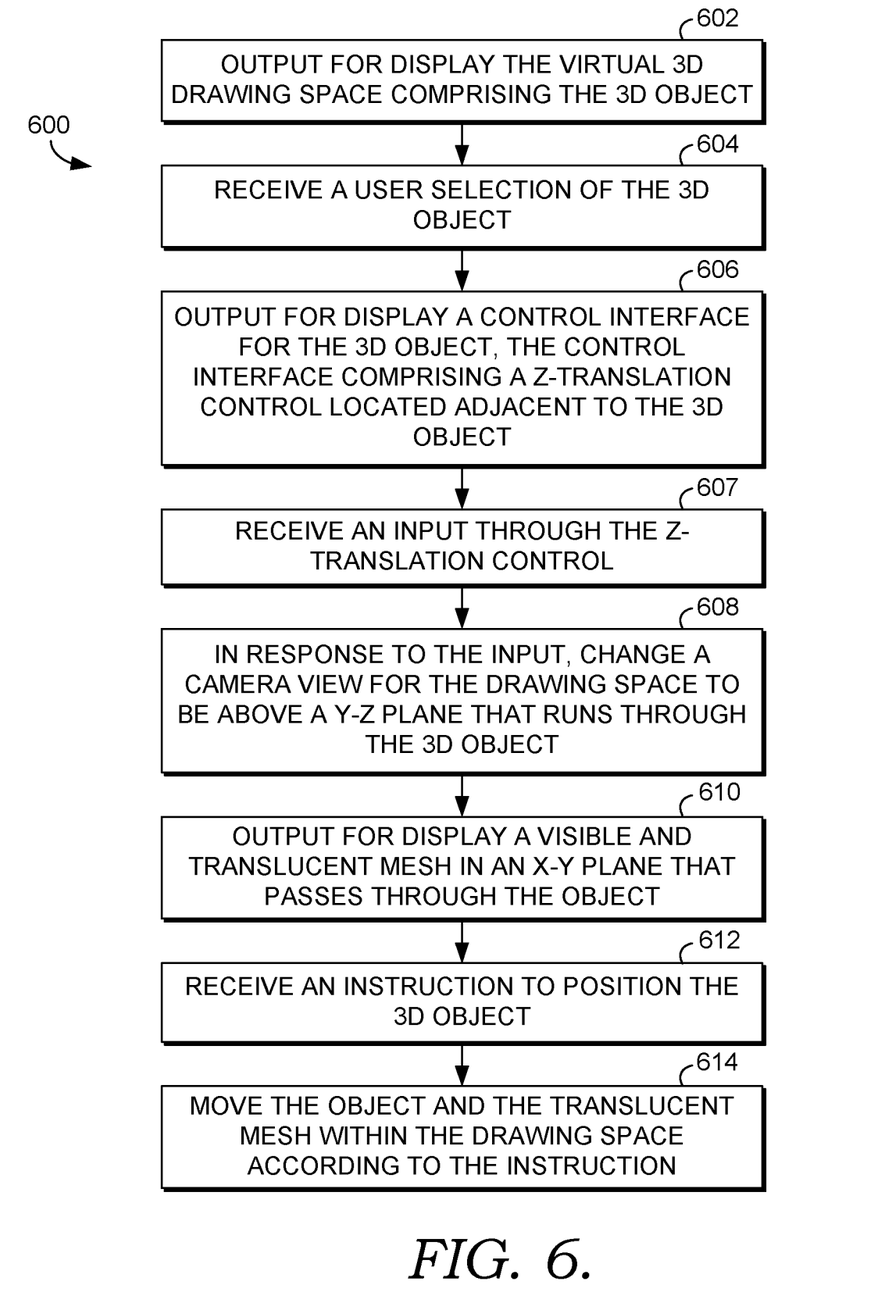
FIG. 6 shows a flow diagram for a method of positioning an object in 3D graphic space, in accordance with aspects of the present disclosure.

Turning now to FIG. 6, a flow diagram of a method 600 for manipulating a 3D graphical object is shown, in accordance with aspects of the present disclosure. Method 600 could be performed by a computing device, such as computing device 700. The computing device can take the form of a laptop computer, a personal computer with detached display, a tablet computer, a smart phone, a holographic display, a virtual reality headset, an augmented reality headset, or some combination of the above or similar devices.

At step 602, the virtual 3D drawing space comprising the 3D object is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

At step 604, a user selection of the 3D object is received. The user selection can occur when the user contacts the 3-D object with a cursor. The cursor can be controlled by a mouse, touchscreen input (e.g., stylus, finger), trackball, gaze detection, head movement, voice control, gestures, or other input techniques. In one aspect, the user selection occurs when the cursor contacts the 3-D object and a second input, such as a mouse click, is provided. As an alternative to a cursor, objects could be selected via voice control, keyboard, or other mechanism.

At step 606, a control around the 3D object is displayed in response to the selection. In one aspect, the control is a two-dimensional control. The control comprises an x-axis rotation control, an y-axis rotation control, and an z-axis rotation control. The control can also include a bounding box that enables uniform and/or non-uniform scaling of the object. In one aspect, the x-axis rotation control is located outside of the bounding box on, or adjacent to, the x-axis. In one aspect, the y-axis rotation control is located outside of the bounding box on, or adjacent to, the y-axis. In one aspect the z-axis rotation control is located outside of the bounding box on, or adjacent to, the z-axis on the side opposite the x or y-axis control. The z-translation control can be located on a side of the box without one of the other controls.

At step 607, an input is received through the z-translation control.

At step 608, in response to the input, a camera view for the scene is changed to be above a y-z plane that runs through the 3D object. In one aspect the camera view is not directly above the objects, but at an angle such as a 45° angle or 30° angle to the x-y plane.

At step 610, a visible and translucent mesh is displayed in an x-y plane that passes through the object. The mesh can pass through the centroid of the object.

At step 612, an instruction to move the 3D object is received. In one aspect, the instruction is received by the user dragging a control forward or backwards. The control can be located off to one side of the screen. The movement of the control can be directly proportional to the corresponding movement caused in the object. In another aspect, there is a ratio between the movement of the control and the movement of the object that causes the object to move further than the control movement. The converse could also be true. The ratio could be set up to cause the object to move less than the control movement. In one aspect the movement ratio between the controller and the object changes as the zoom on the scene changes. The closer the camera is to the object; the less movement is caused by moving the controller. This can give the user more granular control of the object at a close zoom.

At step 614, the object and the translucent mesh are positioned according to the instruction. In other words, both the object and the mesh move together.

Figure 7:
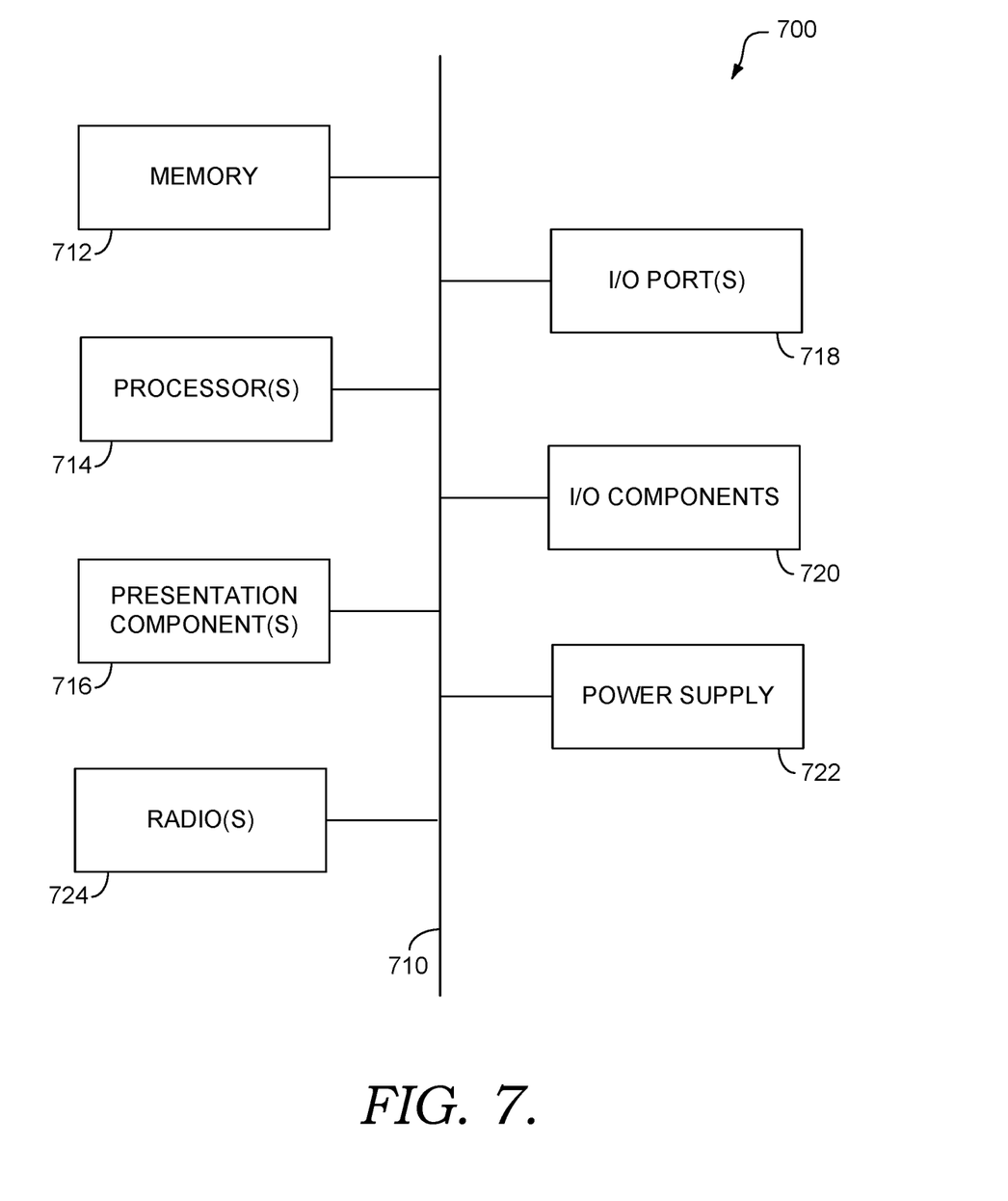
FIG. 7 is a block diagram of an exemplary computing environment suitable for use in implementing an aspect of the present disclosure.

Having described various implementations, an exemplary computing environment suitable for implementing aspects of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of aspects of the disclosure. Neither should the computing device 700 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of manipulating a three-dimensional (3D) graphical object displayed in a virtual 3D drawing space generated by a computer, the method comprising:
    outputting for display, through a user interface, the virtual 3D drawing space comprising the 3D graphical object;
    receiving a user selection of the 3D graphical object;
    outputting for display a control interface for the 3D graphical object, the control interface comprising a z-translation control located adjacent to the 3D graphical object;
    receiving an input through the z-translation control that enables a user to translate the 3D graphical object in the z-dimension;
    in response to the input, changing the user interface to a positioning view, the positioning view comprising changing a camera view for the drawing space to be above a y-z plane that runs through the 3D graphical object, the positioning view also comprising outputting for display a visible and translucent mesh in an x-y plane that passes through the 3D graphical object, and the positioning view also comprising relocating the z-translation control from an original location that is adjacent to the 3D graphical object to a second location disconnected from and away from the 3D graphical object to a side of the 3D drawing space;
    receiving an instruction to move the z-translation control to position the 3D graphical object; and
    moving the 3D graphical object and the translucent mesh within the drawing space in the z-dimension according to the movement of the z-translation control.

2. The method of claim 1, wherein the x-y plane passes through a centroid of the 3D graphical object.

3. The method of claim 1, wherein an intersection line appears on a second 3D graphical object where the translucent mesh intersects the second 3D graphical object.

4. The method of claim 1, wherein the 3D graphical object is selected by a user moving a cursor over the 3D graphical object.

5. The method of claim 1, wherein the 3D graphical object is only moved along the z-axis when the z-translation control is moved.

6. The method of claim 1, wherein the z-translation control is constrained to only move along the z-axis.

7. The method of claim 1, wherein said receiving the instruction to position the 3D graphical comprises a user moving the z-translation control forward.

8. The method of claim 7, wherein the side of the 3D drawing space is a right side of the virtual 3D drawing space from a perspective of a viewer.

9. One or more computer-storage media comprising computer executable instructions, which when executed by a computing device, causes the computing device to perform a method of manipulating a three-dimensional (3D) graphical object displayed in a virtual 3D drawing space generated by a computer, the method comprising:
    outputting for display, a user interface comprising the virtual 3D drawing space comprising the 3D graphical object;
    outputting for display adjacent to the 3D graphical object a z-translation control for the 3D graphical object;
    receiving a user input through the z-translation control that enables a user to translate the 3D graphical object in the z-dimension, the user input being through a touchscreen display;

in response to the user input, changing the user interface to a positioning view, the positioning view comprising displaying a visible and translucent mesh in an x-y plane that passes through the 3D graphical object, the positioning view also comprising relocating the z-translation control from an original location that is adjacent to the 3D graphical object to a second location disconnected from and away from the 3D graphical object to a side of the 3D drawing space, and the positioning view comprising changing a camera view for the drawing space to be above a y-z plane that runs through the 3D graphical object;

receiving an instruction to move the relocated z-translation control; and moving the 3D graphical object and the translucent mesh in the z-dimension according to the movement of the relocated z-translation control.

10. The media of claim 9, wherein the x-y plane passes through a centroid of the 3D graphical object.

11. The media of claim 9, wherein an intersection line appears on a second 3D graphical object where the translucent mesh intersects the second 3D graphical object.

12. The media of claim 9, wherein the 3D graphical object is selected by a user moving a cursor over the 3D graphical object.

13. The media of claim 9, wherein said receiving the instruction to position the 3D graphical object comprises a user moving the relocated z-translation control forward.

14. The media of claim 9, wherein the side of the 3D drawing space is a right side of the virtual 3D drawing space from a perspective of a viewer.

15. The media of claim 9, wherein the z-translation control is constrained to only move along the z-axis.

16. A method of manipulating a three-dimensional (3D) graphical object displayed in a virtual 3D drawing space generated by a computer, the method comprising:

outputting for display, a user interface comprising the virtual 3D drawing space comprising the 3D graphical object;

outputting for display adjacent to the 3D graphical object a z-translation control for the 3D graphical object;

receiving an input through the z-translation control that enables a user to translate the 3D graphical object in the z-dimension;

in response to the input, changing the user interface to a positioning view, the positioning view comprising changing a camera view for the drawing space to be above a y-z plane that runs through the 3D graphical object, the positioning view also comprising relocating the z-translation control away from the 3D graphical object to a side of the 3D drawing space, and the positioning view also comprising displaying a visible and translucent mesh in an x-y plane that passes through the 3D graphical object;

receiving an instruction through the z-translation control to move the relocated z-translation control; and moving the 3D graphical object and the translucent mesh according to the movement of the relocated z-translation control.

17. The method of claim 16, wherein the translucent mesh passed through a center of the 3D graphical object.

18. The method of claim 16, wherein an intersection line appears on a second 3D graphical object where the translucent mesh intersects the second 3D graphical object.

19. The method of claim 16, wherein the 3D graphical object can only move in the z-dimension in response to the instruction to move the z-translation control.

20. The method claim of 16, wherein the side of the 3D drawing space is a right side of the virtual 3D drawing space from a perspective of a viewer.

* * * * *